Patented June 13, 1950

2,511,072

UNITED STATES PATENT OFFICE 2,511,072

SULFUR TRIOXIDE STABILIZATION

Harold G. McCann, Deer Park, N. Y., assignor to Allied Chemical & Dye Corporation, New York, N. Y., a corporation of New York No Drawing. Application April 9, 1949,
Serial No. 86,587

12 Claims. (Cl. 23—174)

This invention relates to the stabilization of liquid sulfur trioxide (substantially pure $SO_3$) and high strength oleums.

At room temperature, liquid sulfur trioxide polymerizes to various degrees. The three generally recognized $SO_3$ modifications melt at approximately 17° C., 32.5° C., and 62° C., respectively. On standing at temperature below about 27° C., in the presence of even small amounts of moisture, the form melting at about 17° C. rapidly polymerizes to the higher melting forms, the mass soon becomes solid, and melts only under pressure, sometimes requiring temperatures up to 100° C. to effect complete liquefaction. High strength oleums of free $SO_3$ strengths upward of about 80% tend to polymerize in similar fashion, degree of polymerization depending chiefly upon the $SO_3$ strength of the oleum and temperatures at which the material is stored. In oleums of the lower portions of the $SO_3$ strength range indicated, certain polymers form, the degree of polymerization increases on passage of time, and while the material may not solidify completely, the ultimate mass may be a liquid phase containing in suspension the various solid polymers noted.

In many industrial processes, it is highly desirable to use $SO_3$ in its strongest obtainable form. However, the foregoing characteristics of sulfur trioxide and high strength oleums create marked disadvantage relative to the storage, shipment and use of such materials. While, for example, sulfur trioxide might be shipped in drums equipped with heating coils, there is involved the first problem of supplying a relatively expensive form of container. Moreover, since heat transfer through a solid material is poor, the solidified sulfur trioxide in the container can be melted by the user only with considerable difficulty. In addition to this disadvantage, after relatively long periods of standing, a large proportion of the sulfur trioxide will have polymerized to the high melting form in which case complete melting can only be effected by heating at high temperature under considerable pressure. To a degree, the same disadvantages apply to high strength oleums.

This invention aims to provide stabilized forms of liquid sulfur trioxide or high strength oleums which do not polymerize to any substantial degree and remain liquid at room temperature. The invention also affords methods for accomplishing the foregoing objective. A further object of the invention is to provide stabilizing agents which are effective in small concentrations in inhibiting polymerization of $SO_3$, are easily dispersed in liquid sulfur trioxide and high strength oleums, and which, in addition, are not decomposed thereby.

According to my invention, it has been found that the incorporation of relatively small amounts of antimony pentafluoride or antimony pentachloride, with substantially anhydrous sulfur trioxide or oleums of $SO_3$ strength such that $SO_3$ polymers tend to form, effects the stabilization above described. The invention further comprises the discovery of stabilizing agents, i. e. those indicated, which possess inherent properties such that the stabilizing objectives of the invention are effected by the mere mixing of the agents with the material to be stabilized, such properties affording the important advantage that no further processing of the mixed material and stabilizing agent is necessary.

As stated above, oleums of $SO_3$ strength of about 80% and upward tend to polymerize to greater or less extent, depending mostly upon $SO_3$ strength and time and temperature of storage. It has been found that by dispersing my soluble stabilizers in liquid sulfur trioxide or in high strength oleums of the type indicated, polymerization is inhibited or minimized. Since anhydrous sulfur trioxide tends to polymerize at a slower rate than does sulfur trioxide containing water (i. e., chemically combined in the form of $H_2SO_4$), and since, from a commercial point of view, it is advantageous to manufacture, store and ship sulfur trioxide as such (in substantially anhydrous form) or as an oleum containing at least about 99.4% free $SO_3$, particular embodiments of my invention are directed to stabilization of these high $SO_3$ content materials.

When antimony pentafluoride is employed as inhibitor for sulfur trioxide in the manner herein described, markedly superior stabilized materials may be obtained. Accordingly, the pentafluoride is the preferred polymerization inhibitor. When antimony pentachloride is utilized as stabilizing agent, amounts of polymer formed may be somewhat greater than in the case of the pentafluoride inhibitor. For many purposes in commerce, however, the degree of stabilization obtained with the pentachloride stabilizer is satisfactory.

The quantity of treating agent employed depends largely upon the degree of stabilization desired and the amount of water present in the material. In general, the larger the amount of agent added, the greater is the stabilizing effect thereof; and, considering anhydrous sulfur trioxide (containing substantially no water) as a starting point, the greater the amount of water (up to approximately 1% by weight), the greater is the tendency for $SO_3$ polymers to form, and the greater will be the amount of stabilizer required to effect a given degree of stabilization. For substantially anhydrous sulfur trioxide adequate stabilization may be obtained by employing antimony pentafluoride treating agent in amount in the range of approximately 0.4% to 1.0% by weight. When stabilizing oleums of $SO_3$ strength equal to or greater than about 99.4% to about 100%, since the combined water present enhances the tendency of polymer formation, somewhat higher antimony pentafluoride inhibitor concentrations, i. e., 0.4 to 2.5% by weight may be desired. Under conditions normally encountered in commerce, such stabilized materials do not polymerize to any appreciable extent (i. e., not more than 1-2%) and remain substantially in liquid form when brought to room temperature even though previously stored for several weeks at temperature of zero degrees C. or less. Hence, products of this type are completely acceptable in nearly all commercial applications. In the case of utilization of antimony pentachloride, quantities employed may be somewhat greater than indicated in order to obtain degrees of stabilization similar to those secured by use of the pentafluoride. When stabilizing sulfur trioxide or oleums of higher $SO_3$ strengths, it is preferable to employ substantially anhydrous agents in order to maintain low water content of the end product.

It is usually desirable to avoid dilution of the sulfur trioxide and to maintain $SO_3$ strength at the maximum value possible. Therefore, it is preferred to utilize treating material in amount equivalent to not more than 6% by weight, the latter quantity being generally appreciably more than adequate to effect desired stabilization of sulfur trioxide or high strength oleums. Moreover, I find that overall results are not significantly better when the stabilizing agents of the invention are used in quantities much in excess of 6% by weight.

The preferred products of the invention, i. e. the inhibited sulfur trioxide or oleums of $SO_3$ strength at least about 99.4% by weight, which do not polymerize to any appreciable extent preferably should be kept sealed off from contact with air, since a small amount of moisture causes such products to lose some stability and to form polymers.

The sulfur trioxide or oleum to be treated may be obtained from any suitable source. For example, substantially 100% $SO_3$ may be obtained by distilling say 30% oleum under conditions to avoid vaporization of $H_2SO_4$, and condensing the $SO_3$ at temperature, say 20-30° C., at which liquid sulfur trioxide has sufficiently low vapor pressure. Similarly, liquid sulfur trioxide may be obtained from the dry mist-free, say 10%, $SO_3$ exiting a catalytic $SO_2$ oxidation operation, by compressing the gas to about 160-170 lbs. per square inch, and cooling the compressed gas to 20-25° C., under which conditions about 70% of the $SO_3$ may be liquefied and recovered as substantially 100% liquid sulfur trioxide.

While I do not intend to limit myself to any particular theory, I believe that the stabilizing agents of this invention dissolve in the oleum or sulfur trioxide, thereby forming solutions of agent in the material stabilized. This solubility of my agents accounts for the ease of incorporation and dispersion of inhibitor in the oleum or sulfur trioxide, and affords the marked advantage of the present invention in that no further processing of the mixed $SO_3$ material and stabilizing agent is required.

The treating agent used may be added directly to the liquid to be stabilized and dissolved by agitation, or in the case of stabilizing substantially 100% sulfur trioxide, the vaporous $SO_3$ conveniently may be condensed in a closed vessel in which the treating material to be used has been previously placed.

The following examples illustrate the practice of my invention, the parts and percentages being by weight:

Example 1.—About 0.5% of pure antimony pentafluoride was added to substantially anhydrous sulfur trioxide and the mixture mildly agitated at substantially room temperature. A precipitate formed initially which readily redissolved. The resulting mixture was stored for five weeks at about 0° C., and at the end of this time was brought to room temperature. The sulfur trioxide was completely unpolymerized, i. e. contained no unmelted solid. Storage was continued for 2½ weeks additional at about minus 40 to minus 60° C. and at the end of this time was again brought to room temperature. The sulfur trioxide then contained about 1% of solid polymer.

Example 2. — Antimony pentafluoride in amount of about 1.0% was added to substantially anhydrous sulfur trioxide and the mixture mildly agitated at about room temperature until solution was obtained. The resulting mixture was then stored at about minus 40 to minus 60° C. for two weeks, after which time it was warmed to room temperature. About 0.5% unmelted solid remained in the material. Storage at 0° C. was continued for an additional six weeks. At the end of this time the material melted to a liquid containing about 1% solids.

Example 3.—About 1.0% of antimony pentafluoride was mixed with high strength oleum to produce a homogeneous solution. The water content (chemically combined) of the resulting mixture was about 0.1% (approximately 99.5% $SO_3$). This treated oleum was stored at minus 20 to minus 30° C. for two weeks and then warmed to room temperature. About 2% solid material remained unmelted. Storage was continued for an additional 4 weeks at minus 20 to minus 30° C. Upon warming the oleum to room temperature there remained about 5% unmelted polymer.

Example 4.—About 1.0% antimony pentachloride was added to substantially anhydrous sulfur trioxide and the mixture mildly agitated at about room temperature to obtain total solution. The resulting mixture was then stored at about 0° C. for two weeks, after which time it was warmed to room temperature. About 5% unmelted solid remained in the material.

It will be noted that in the above examples, the test conditions were much more harsh than the conditions normally encountered in commerce.

I claim:

1. The method of stabilizing material of the group consisting of sulfur trioxide and oleum of $SO_3$ strength such that $SO_3$ polymers tend to form, which method comprises incorporating with said material a compound of the group consisting of antimony pentafluoride and antimony pentachloride in amount sufficient to stabilize said material.

2. The method of stabilizing material of the group consisting of sulfur trioxide and oleum of SO₃ strength such that SO₃ polymers tend to form, which method comprises incorporating with said material a compound of the group consisting of antimony pentafluoride and antimony pentachloride in amount sufficient to stabilize said material, said amount being not greater than about 6% by weight.

3. The method of stabilizing material of the group consisting of sulfur trioxide and oleum of SO₃ strength at least about 99.4% by weight, which method comprises incorporating with said material a compound of the group consisting of antimony pentafluoride and antimony pentachloride in amount sufficient to stabilize said material.

4. The method of stabilizing material of the group consisting of sulfur trioxide and oleum of SO₃ strength at least about 99.4% by weight, which method comprises incorporating with said material a compound of the group consisting of antimony pentafluoride and antimony pentachloride in amount sufficient to stabilize said material, said amount being not greater than about 6% by weight.

5. The method of stabilizing material of the group consisting of sulfur trioxide and oleum of SO₃ strength at least about 99.4% by weight, which method comprises incorporating with said material substantially anhydrous antimony pentafluoride in amount sufficient to stabilize said material.

6. The method of stabilizing material of the group consisting of sulfur trioxide and oleum of SO₃ strength at least about 99.4% by weight, which method comprises incorporating with said material substantially anhydrous antimony pentafluoride in amount in the range approximately 0.4% to 2.5% by weight.

7. The method of stabilizing substantially anhydrous sulfur trioxide which comprises incorporating with said sulfur trioxide substantially anhydrous antimony pentafluoride in amount in the range of approximately 0.4% to 1.0% by weight.

8. A stable composition resistant to polymerization comprising material of the group consisting of sulfur trioxide and oleum of SO₃ strength such that SO₃ polymers tend to form, and containing a relatively small amount of a compound of the group consisting of antimony pentafluoride and antimony pentachloride.

9. A composition comprising material of the group consisting of sulfur trioxide and oleum of SO₃ strength at least about 99.4% by weight and containing a compound of the group consisting of antimony pentafluoride and antimony pentachloride in amount sufficient to stabilize said material, said amount being not greater than about 6% by weight.

10. A composition comprising material of the group consisting of sulfur trioxide and oleum of SO₃ strength at least about 99.4% by weight, and containing antimony pentafluoride in amount sufficient to stabilize said material.

11. A composition comprising material of the group consisting of sulfur trioxide and oleum of SO₃ strength at least about 99.4% by weight, and containing antimony pentafluoride in amount in the range approximately 0.4 to 2.5% by weight.

12. A composition comprising substantially anhydrous sulfur trioxide containing antimony pentafluoride in amount in the range of approximately 0.4% to 1.0% by weight.

HAROLD G. McCANN.

No references cited.